(12) United States Patent
West et al.

(10) Patent No.: US 12,354,459 B2
(45) Date of Patent: Jul. 8, 2025

(54) LOOSE SENSOR DETECTION

(71) Applicant: The Goodyear Tire & Rubber Company, Akron, OH (US)

(72) Inventors: Jeffrey McKay West, Uniontown, OH (US); Michel Marguerite Walther Ghislain Constant, Bastogne (BE); Peter Jung-min Suh, Stow, OH (US); Dorian Boluix, Thionville (FR); Oliviero Truffo, Imbringen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 36 days.

(21) Appl. No.: 18/504,656

(22) Filed: Nov. 8, 2023

(65) Prior Publication Data
US 2024/0177589 A1    May 30, 2024

Related U.S. Application Data

(60) Provisional application No. 63/385,073, filed on Nov. 28, 2022.

(51) Int. Cl.
  *G08B 21/18*  (2006.01)
  *B60C 23/04*  (2006.01)
  *G07C 5/00*   (2006.01)

(52) U.S. Cl.
  CPC .......... *G08B 21/18* (2013.01); *B60C 23/0481* (2013.01); *G07C 5/008* (2013.01)

(58) Field of Classification Search
  CPC ..... G08B 21/18; B60C 23/0481; B60C 19/00; B60C 23/06; B60C 2019/004; B60C 23/0479; G07C 5/008
  USPC ...................................................... 340/686.2
  See application file for complete search history.

(56) References Cited

U.S. PATENT DOCUMENTS

| | | |
|---|---|---|
| 4,157,530 A | 6/1979 | Merz |
| 4,361,202 A | 11/1982 | Minovitch |
| 4,936,138 A | 6/1990 | Cushman et al. |
| 6,434,399 B1 | 8/2002 | Kamperschroer |

(Continued)

FOREIGN PATENT DOCUMENTS

| | | |
|---|---|---|
| EP | 0494763 B1 | 5/1996 |
| EP | 2586633 A1 | 5/2013 |

(Continued)

OTHER PUBLICATIONS

Bonnie et al., Method and Device for determining the position of pressure sensors in a tire pressure monitoring system, Clarivate Analytics, 2008, 49 pages, 2008.

(Continued)

*Primary Examiner* — Eric Blount
(74) *Attorney, Agent, or Firm* — Edward T. Kennedy (57) ABSTRACT

Disclosed are examples for detecting a displacement of a sensor within a tire. A baseline signal strength is compared to a measured signal strength. When a calculated comparison value (e.g., delta standard deviation) meets or exceeds a threshold value, the sensor is determined to be displaced from the expected location in the tire. When a sensor is determined to be displaced or otherwise loose from the expected location within the tire, an alert can be generated to provide notice to the vehicle driver or other entity of the issue so that the issue can then be remedied.

11 Claims, 4 Drawing Sheets

(56) References Cited

U.S. PATENT DOCUMENTS

| | | |
|---|---|---|
| 6,463,798 B2 | 10/2002 | Niekerk et al. |
| 6,489,888 B1 | 12/2002 | Honeck et al. |
| 6,725,712 B1 | 4/2004 | King et al. |
| 6,750,761 B1 | 6/2004 | Newman |
| 6,879,252 B2 | 4/2005 | Dezorzi et al. |
| 6,885,282 B2 | 4/2005 | Desai et al. |
| 6,885,296 B2 | 4/2005 | Hardman et al. |
| 6,941,803 B2 | 9/2005 | Hirohama et al. |
| 6,952,160 B1 | 10/2005 | Bennie et al. |
| 7,010,968 B2 | 3/2006 | Stewart et al. |
| 7,131,323 B2 | 11/2006 | Hirota |
| 7,177,739 B2 | 2/2007 | Kuchler |
| 7,355,509 B2 | 4/2008 | Rennie et al. |
| 7,367,227 B2 | 5/2008 | Stewart et al. |
| 7,385,485 B2 | 6/2008 | Thomas et al. |
| 7,423,532 B2 | 9/2008 | Stewart et al. |
| 7,425,892 B2 | 9/2008 | Mori et al. |
| 7,506,540 B1 | 3/2009 | Job |
| 7,750,798 B2 | 7/2010 | Mori |
| 7,839,273 B2 | 11/2010 | Tabe |
| 7,948,364 B2 | 5/2011 | Lin et al. |
| 8,188,848 B2 | 5/2012 | Lange et al. |
| 8,204,645 B2 | 6/2012 | Weston |
| 8,217,776 B2 | 7/2012 | Hyde |
| 8,332,103 B2 | 12/2012 | Greer et al. |
| 8,380,460 B2 | 2/2013 | Miller et al. |
| 8,396,629 B1 | 3/2013 | Kim et al. |
| 8,498,785 B2 | 7/2013 | Juzswik |
| 8,577,643 B2 | 11/2013 | Kuchler |
| 8,584,517 B2 | 11/2013 | Strahan |
| 8,626,413 B2 | 1/2014 | Kammann |
| 8,659,411 B2 | 2/2014 | Fink |
| 8,843,267 B2 | 9/2014 | Park et al. |
| 9,162,542 B2 | 10/2015 | Shima et al. |
| 9,180,742 B2 | 11/2015 | Kosugi et al. |
| 9,259,978 B2 | 2/2016 | Patel et al. |
| 9,278,589 B2 | 3/2016 | Laifenfeld et al. |
| 9,399,376 B2 | 7/2016 | Lickfelt et al. |
| 9,440,501 B2 | 9/2016 | Huang et al. |
| 9,463,673 B2 | 10/2016 | Huang et al. |
| 9,469,166 B2 | 10/2016 | Mcintyre et al. |
| 9,584,881 B2 | 2/2017 | Taki |
| 9,769,305 B2 | 9/2017 | Banerjee et al. |
| 9,783,011 B2 | 10/2017 | Taki |
| 9,802,447 B2 | 10/2017 | Petrucelli |
| 9,851,227 B2 | 12/2017 | Lammers |
| 9,937,759 B2 | 4/2018 | Terada et al. |
| 9,950,577 B1 | 4/2018 | Marlett et al. |
| 9,973,831 B2 | 5/2018 | Mejegård et al. |
| 10,006,799 B2 | 6/2018 | Hanson et al. |
| 10,075,819 B2 | 9/2018 | Santavicca et al. |
| 10,081,317 B2 | 9/2018 | Naboulsi |
| 10,082,381 B2 | 9/2018 | McMillen |
| 10,093,138 B2 | 10/2018 | Decia et al. |
| 10,131,320 B2 | 11/2018 | Schmotzer et al. |
| 10,132,719 B2 | 11/2018 | Fudulea |
| 10,237,690 B2 | 3/2019 | Thakur et al. |
| 10,442,253 B2 | 10/2019 | Werner et al. |
| 10,479,300 B2 | 11/2019 | Wheeler et al. |
| 10,549,587 B2 | 2/2020 | Kollmitzer et al. |
| 10,685,510 B2 | 6/2020 | Linsmeier et al. |
| 10,726,714 B2 | 7/2020 | Sekizawa et al. |
| 10,780,749 B2 | 9/2020 | Hassani et al. |
| 2002/0092345 A1 | 7/2002 | Van et al. |
| 2005/0179530 A1 | 8/2005 | Stewart et al. |
| 2006/0028326 A1 | 2/2006 | Haas |
| 2008/0143507 A1 | 6/2008 | Cotton et al. |
| 2008/0150712 A1 | 6/2008 | Cooprider et al. |
| 2009/0002146 A1 | 1/2009 | Lin |
| 2009/0066498 A1 | 3/2009 | Jongsma et al. |
| 2009/0299570 A1 | 12/2009 | Kammann |
| 2010/0063669 A1* | 3/2010 | Fink ................ B60C 23/0416 |
| | | 701/29.6 |
| 2011/0071737 A1 | 3/2011 | Greer et al. |
| 2011/0282548 A1 | 11/2011 | Haas |
| 2012/0133498 A1 | 5/2012 | Nah et al. |
| 2012/0173073 A1 | 7/2012 | Hanna |
| 2014/0002257 A1 | 1/2014 | Han et al. |
| 2014/0379231 A1 | 12/2014 | Hawes et al. |
| 2016/0039365 A1 | 2/2016 | Vanderwall |
| 2016/0129736 A1 | 5/2016 | Peine et al. |
| 2017/0106706 A1* | 4/2017 | Bettecken .......... B60C 23/0488 |
| 2017/0174014 A1 | 6/2017 | Stewart et al. |
| 2018/0074490 A1 | 3/2018 | Park |
| 2019/0126694 A1 | 5/2019 | Stewart et al. |
| 2019/0244301 A1 | 8/2019 | Seth et al. |
| 2020/0101802 A1 | 4/2020 | Nasser et al. |
| 2020/0346500 A1 | 11/2020 | Zeng et al. |
| 2020/0369100 A1 | 11/2020 | Pierre et al. |
| 2020/0398617 A1 | 12/2020 | Kandler et al. |
| 2022/0176968 A1 | 6/2022 | Brooks |
| 2022/0230481 A1 | 7/2022 | Singh et al. |

FOREIGN PATENT DOCUMENTS

| | | |
|---|---|---|
| WO | 2002057097 A3 | 7/2002 |
| WO | 2006100577 A1 | 9/2006 |
| WO | 2006104484 A1 | 10/2006 |
| WO | 2008116683 A1 | 10/2008 |
| WO | 2013139977 A1 | 9/2013 |
| WO | 2017018700 A1 | 2/2017 |
| WO | 2019092052 A1 | 5/2019 |
| WO | 2019243374 A1 | 12/2019 |
| WO | 2020053901 A1 | 3/2020 |
| WO | 2020123812 A1 | 6/2020 |

OTHER PUBLICATIONS

Search Report for European application No. EP23212104 dated Mar. 19, 2024.

* cited by examiner

LOOSE SENSOR DETECTION

BACKGROUND

Vehicles can be equipped with tire sensors mounted on a tire for each wheel on the vehicle to obtain information regarding physical parameters of the tire, such as, for example, tire pressure, temperature, and the like. The information obtained from the sensors can be used to detect potential issues with the tires that may result in unsafe driving conditions. For example, data obtained from a tire sensor may be used to detect an underinflated tire. Upon detection, the user of the vehicle can be notified of the underinflated tire through an indicator light in the dashboard of the vehicle.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DEFINITIONS

"CAN bus" is an abbreviation for controller area network.

"Circumferential" means lines or directions extending along the perimeter of the surface of the annular tread perpendicular to the axial direction.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Innerliner" means the layer or layers of elastomer or other materials that form the inside surface of a tubeless tire and that contain the inflating fluid within the tire.

"Lateral" means an axial direction.

"Lateral edges" mean a line tangent to the axially outermost tread contact patch or footprint as measured under normal load and tire inflation, the lines being parallel to the equatorial centerplane.

"TPMS" means a tire pressure monitoring system, which is an electronic system that measures the internal pressure of a tire and is capable of communicating the pressure to a processor that is mounted on the vehicle and/or is in electronic communication with the electronic systems of the vehicle.

"Tread element" or "traction element" means a rib or a block element defined by a shape having adjacent grooves.

DETAILED DESCRIPTION

The present disclosure relates to detecting a displacement of a sensor within a tire. A displaced or loose sensor may correspond to a sensor that is at least partially detached from an expected location within a tire. When a sensor is displaced, the tire parameter data (e.g., pressure, temperature, rotation, etc.) received from the sensor may become unreliable for detecting potential unsafe driving conditions associated with a tire of the vehicle (e.g., underinflated tire, etc.). According to various examples of the present disclosure, a displaced sensor can be detected based at least in part on a measured signal strength (e.g., received signal strength indicator (RSSI)) of the sensor. When a sensor is determined to be displaced or otherwise loose from the expected location in the tire, an alert can be generated to provide notice to the vehicle driver or another entity of the issue so that the issue can then be remedied.

Received signal strength indicator (RSSI) corresponds to a measurement of how well a device can hear a signal. In the examples of the present disclosure, RSSI can correspond to a measurement of how well a receiver on or in proximity to a vehicle can hear a signal from a sensor in a tire. In various examples, a baseline signal strength can be determined based at least in part on sensor data received when the sensor is known or otherwise presumed to be at the expected position within the tire. During the operation of the vehicle, a receiver coupled to the vehicle can collect sensor parameter data from the sensor and the collected data can be monitored. The signal strength of the collected data can be measured over a period of cycles.

According to various examples, the measured signal strength can be compared to the baseline signal strength to determine whether there is an issue with the placement of the sensor within the tire. For example, a delta average or a delta standard deviation between the baseline signal strength and the measured signal strength can be calculated and compared to a predefined threshold (e.g., "0.8"). If the calculated value meets or exceeds the predefined threshold, the sensor can be determined to be loose or otherwise at least partially detached from the expected location within the tire.

Figure 1:
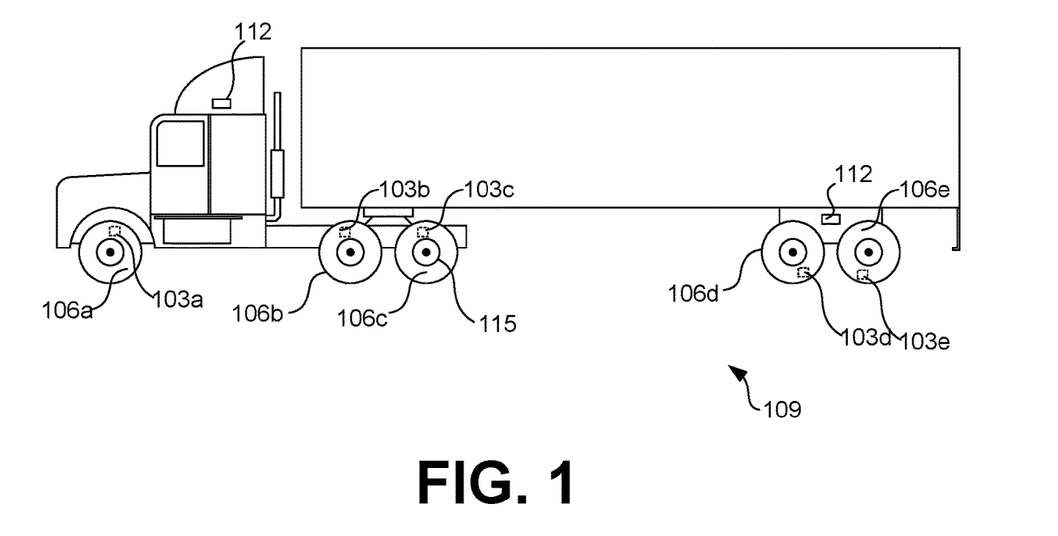
FIG. 1 is a drawing of a vehicle with one or more tires that include a sensor unit according to various embodiments of the present disclosure.
Figure 2:
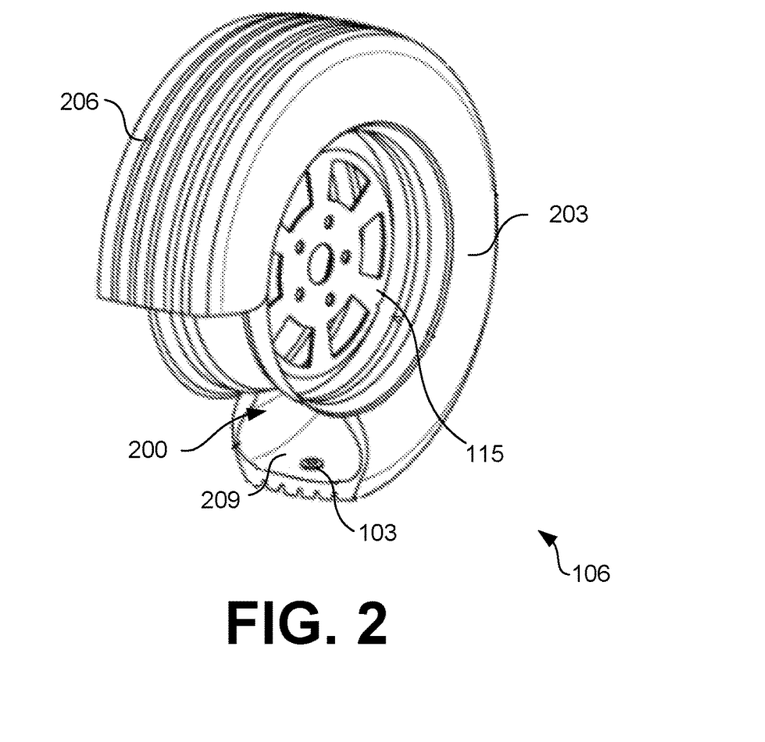
FIG. 2 is a perspective cross-sectional view of a tire shown in FIG. 1, illustrating an example placement of the sensor unit according to various embodiments of the present disclosure.

Turning now to FIGS. 1 and 2, shown are examples of sensor units 103 attached to tires 106 of a vehicle 109 according to various embodiments. In particular, FIG. 1 illustrates an example of a vehicle 109 comprising a plurality of tires 106 (e.g., 106*a*, 106*b*, 106*c*, 106*d*, 106*e*). Each tire 106 includes a sensor unit 103 (e.g., 103*a*, 103*b*, 103*c*, 103*d*, 103*e*). FIG. 2 illustrates a cross-sectional view of a tire 106 illustrating the sensor unit 103 being mounted to the inner surface of the tire 106.

The tires 106 are of conventional construction, and each tire is mounted on a respective wheel 115 as known to those skilled in the art. Each tire 106 includes a pair of sidewalls 203 (only one shown) that extend to a circumferential tread 206. An innerliner 209 is disposed on the inner surface of the tire 106, and when the tire is mounted on the wheel 115, an internal cavity 200 is formed, which is filled with a pressurized fluid, such as air.

As illustrated in FIG. 2, a sensor unit 103 is attached to the innerliner 209 of each tire 106 by means such as an adhesive, and is configured to measure certain parameters or conditions of the tire 106 as will be described in greater detail below. Although the sensor unit 103 is illustrated as being attached to the innerliner 209 in FIG. 2, it is understood that the sensor unit 103 may be attached in such a manner, or to other components of the tire 106, such as on or in one of the sidewalls 203, on or in the tread 206, on the wheel 115, and/or a combination thereof. For the purpose of convenience, reference herein shall be made to mounting of the sensor unit 103 on the tire 106, with the understanding that such mounting includes all such types of attachments.

In various examples, the sensor unit 103 is mounted on each tire 106 for the purpose of detecting certain real-time parameters of the tire 106, such as tire pressure and tire temperature. In various examples, the sensor unit 103 can comprise at least one of a pressure sensor to sense the inflation pressure within a cavity 200, a temperature sensor to measure a temperature of the tire, an accelerometer for measuring acceleration of a wheel 115 on which the tire 106 is mounted, a revolution counter to measure a revolution time of the wheel 115, and/or other types of sensors. The sensor unit 103 may be part of a commercially-available tire pressure monitoring system (TPMS) module or sensing unit.

In various examples, the sensor unit 103 comprises a processor and memory to store vehicle tire information for each specific tire 106. For example, the tire vehicle tire information may include a tire identifier (ID), manufacturing information for the tire 106 (e.g., model number, manufacturer name, etc.), size information (e.g., rim size, width, and outer diameter), manufacturing location, manufacturing date, a treadcap code that includes or correlates to a compound identification, a mold code that includes or correlates to a tread structure identification, and/or other information. The vehicle tire information may also include a service history or other information to identify specific features and parameters of each tire 106. Alternatively or additionally, the vehicle tire information may be included in another sensor unit 103, or in a separate vehicle storage medium, such as a tire ID tag, which preferably is in electronic communication with the sensor unit 103.

The sensor unit 103 further includes an antenna (not shown) for wirelessly transmitting measured parameters and tire information data to a remote processor for analysis, such as a processor integrated into a vehicle computing device 112, a Controller Area Network (CAN) bus associated with the vehicle 109, and/or a cloud computing device. According to various embodiments, each one of the tires 106 on the vehicle 109 may include one or more of the sensor units 103.

While the vehicle 109 of FIG. 1 is depicted as a commercial truck, the vehicle 109 may comprise any type of vehicle that employs tires where the commercial truck is presented as an example. To this end, the vehicle 109 may comprise other vehicles falling into various categories such as passenger vehicles, off-road vehicles and the like, in which such vehicles 109 include a greater or lesser number of tires 106 than are shown in FIG. 1.

Figure 3:
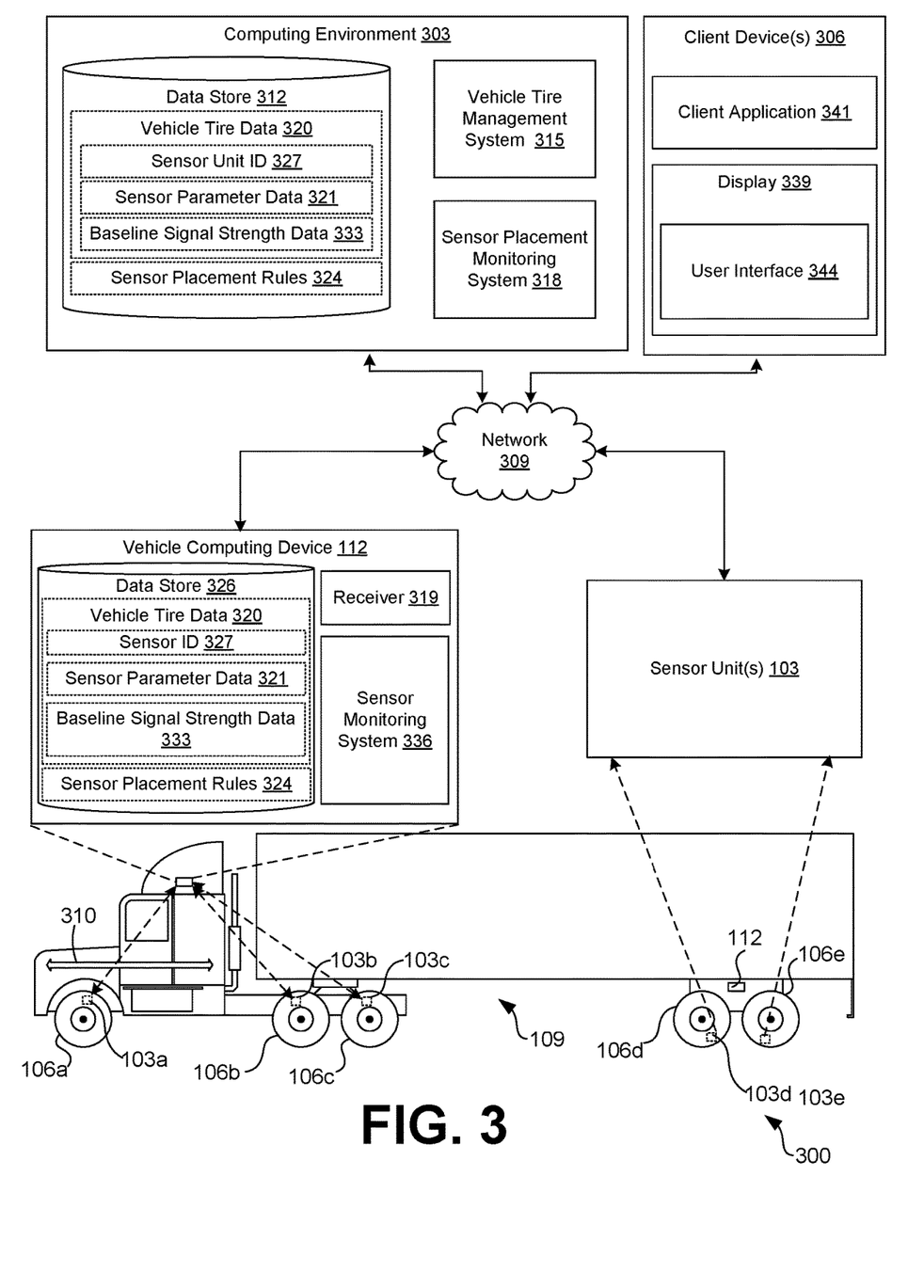
FIG. 3 is a schematic block diagram of a networked environment according to various embodiments of the present disclosure.

Turning now to FIG. 3, shown is a networked environment 300 according to various embodiments. The networked environment 300 includes a computing environment 303, a client device 306, and a vehicle 109 which are in data communication with each other via a network 309. The vehicle 109 can include one or more vehicle computing devices 112, one or more sensor unit(s) 103, and a Controller Area Network (CAN) bus 310 that facilitates data communication between various systems on the vehicle 109. In one embodiment, the vehicle computing device(s) 112 are coupled to the CAN bus 310 and may communicate with systems included on the CAN bus 310.

The network 309 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 309 can also include a combination of two or more networks 309. Examples of networks 309 can include the Internet, intranets, extranets, virtual private networks (VPNs), and similar networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource, and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. Also, various data is stored in a data store 312 that is accessible to the computing environment 303. The data store 312 may be representative of a plurality of data stores 312 as can be appreciated. The data stored in the data store 312, for example, is associated with the operation of the various applications and/or functional entities described below.

The components executed on the computing environment 303, for example, include a vehicle tire management system 315, a sensor placement monitoring system 318, and other applications, services, processes, systems, engines, or functionality not discussed in detail herein. The vehicle tire management system 315 is executed to track the location and status of tires 106 mounted on a plurality of vehicles 109. Such a vehicle tire management system 315 may track hundreds if not thousands of tires 106 on many vehicles 109. The vehicle tire management system 315 indicates to operators when tires 106 may need to be serviced, replaced, or the vehicle tire management system 315 may provide other information.

The sensor placement monitoring system 318 is executed to detect a displacement or detachment of a sensor unit 103 from an expected position on a given tire 106 by monitoring the signal strength between the sensor unit 103 and receiver 319 obtaining the sensor parameter data 321 collected by the sensor unit 103 and transmitted to the receiver 319. In various examples, the sensor placement monitoring system 318 can detect an issue with a placement of the sensor unit 103 by comparing a measured signal strength with a baseline signal strength. In various examples, a delta standard deviation between a measured signal strength and the baseline signal strength is calculated and compared to a predefined threshold value. If the delta standard deviation meets or exceeds the predefined threshold value, the sensor placement monitoring system 318 can determine that there is an issue with the placement of the sensor unit 103 on the given tire 106.

In other examples, a delta average between the measured signal strength and the baseline signal strength can be calculated and compared to a predefined threshold value. Similarly, if the delta average meets or exceeds a predefined threshold value, the sensor placement monitoring system 318 can determine that there is an issue with the placement of the sensor unit 103. For example, the issue can correspond to the sensor unit 103 being loose or at least partially detached from the expected location (e.g., installed location) on the tire 106. In various examples, the threshold value that is compared to a delta standard deviation can differ from the threshold value that is compared to a delta average.

In one or more examples, upon detecting an issue with the placement of the sensor unit 103, the sensor placement monitoring system 318 can generate an alert notification indicating the detected issue. The alert notification can be a visual alert (e.g., user interface, indicator light on vehicle, etc.) or an audio alert, as can be appreciated. In some examples, the sensor placement monitoring system 318 can transmit the alert notification to a computing device associated with the vehicle 109 and/or user of the vehicle, a client device 306, one or more vehicle computing devices 112, and/or another device. In some examples, upon detecting the issue, the sensor placement monitoring system 318 can notify the vehicle tire management system 315 of the issue such that the vehicle tire management system 315 can proceed with sending a notification to the user or associate associated with the vehicle 109.

In various examples, the sensor placement monitoring system 318 can further be executed to generate a baseline signal strength by determining the signal strength of the sensor unit 103 when the sensor unit 103 is known or presumed to be in the expected (e.g., installed) location on the tire 106. For example, the baseline signal strength can be generated using previously collected sensor parameter data 321 (e.g., temperature, pressure, etc.) and/or previously calculated signal strength data. In this example, the sensor placement monitoring system 318 can obtain a predefined number of previously received sensor readings and generate the baseline signal strength by determining the signal strength associated with the previously received sensor readings. In various examples, the baseline signal strength can be recalculated after a predefined number of cycles or randomly.

In some examples, the baseline signal strength can be a static number that is calculated upon installation of a new tire 106 on the vehicle 109. In this situation, the sensor unit 103 is presumed to be in the expected location. As such, once the new tire 106 is installed on the vehicle 109, the sensor data can be collected from the sensor unit 103 and the signal strength associated with the collected data can be calculated. In various examples, the signal strength is calculated over a predefined number of cycles (e.g., 60 cycles) with the vehicle 109 traveling within a predefined range of speed (e.g., 60-80 miles per hour (mph)).

In some examples, the originally determined baseline signal strength can be recalibrated over time. For example, while the baseline signal strength can be calculated upon installation, various factors may cause the baseline signal strength to fluctuate even with the sensor unit 103 remaining in the appropriate position. Some of the factors may include environment factors, such as, for example, temperature, moisture, content of the air, and/or other factors. In some examples, the baseline signal strength is obtained from a vehicle computing device 112 and/or a sensor unit 103.

In various examples, the sensor placement monitoring system 318 can further be executed to measure a signal strength based at least in part on an analysis of the sensor parameter data 321 received from one or more vehicle computing devices 112, sensor unit 103, and/or other device. For example, the sensor placement monitoring system 318 can evaluate the RSSI associated with the received sensor parameter data 321 and measure a signal strength over a predefined period of cycles. For example, during operation of the vehicle 109, sensor parameter data 321 can be collected and the collected data can be used to measure the signal strength. In some examples, the measured signal strength corresponds to the signal strength of collected data while the vehicle 109 is traveling within a predetermined range of speed. Accordingly, the measured signal strength and the baseline signal strength can correspond to data over a same or similar number of cycles that is collected while the vehicle is traveling within a same range of speed.

It should be noted that although the sensor placement monitoring system 318 is illustrated in FIG. 3 as being separate from the vehicle tire management system 315, in various embodiments, at least a portion of the functionality of the sensor placement monitoring system 318 can be implemented as part of the vehicle tire management system 315. Similarly, in some embodiments, at least a portion of the vehicle tire management system 315 can be implemented as part of the sensor placement monitoring system 318.

The data stored in the data store 312 includes, for example, vehicle tire data 320, sensor placement rules 324, and potentially other data. The vehicle tire data 320 can include information for each specific tire 106. For example, the vehicle tire data 320 may include a tire identifier, manufacturing information for the tire 106 (e.g., manufacture name, tire model, etc.), tire size information (e.g., rim size, width, and outer diameter, etc.), manufacturing location, manufacturing date, a treadcap code that includes or correlates to a compound identification, a mold code that includes or correlates to a tread structure identification, and/or other information. The vehicle tire data 320 may also include a service history or other information to identify specific features and parameters of each tire 106. The vehicle tire data 320 can further include a sensor unit ID 327, sensor parameter data 321, baseline signal strength data 333, and/or other data.

The sensor unit ID 327 can include an alphanumeric identifier that can be used to identify the sensor unit 103 on a given tire 106. In some examples, the sensor unit ID can include additional information about the sensor unit 103, including a location of the tire, which axel the tire 106 is installed on, a side of the vehicle 109 on which the tire 106 is located (e.g., left, right), and/or other information.

The sensor parameter data 321 can comprise data collected from a sensor unit 103 on a given tire 106. As previously discussed, the sensor unit 103 can comprise at least one of a pressure sensor, a temperature sensor, an accelerometer, a revolution counter, and/or other types of sensors. Accordingly, the sensor parameter data 321 can include temperature data, pressure data, accelerometer data, revolution data, and/or other types of data. In various examples, the sensor parameter data 321 can further include signal strength data associated with one or more of the types of data collected from the sensor parameter data 321. In various examples, the sensor parameter data 321 can further include a timestamp associated with the collected data.

The baseline signal strength data 333 corresponds to the baseline signal strength that is calculated by the remote sensor placement monitoring application, the sensor unit 103, the sensor monitoring system 336, and/or other applications or devices. The baseline signal strength data 333 represents the signal strength of the sensor unit 103 when the sensor unit 103 is known or presumed to be in the expected (e.g., installed) location on the tire 106. In various examples, the baseline signal strength data 333 is calculated using previously collected sensor parameter data 321 (e.g., temperature, pressure, etc.) and/or previously calculated signal strength data. For example, a predefined number of previously received sensor readings can be used to generate the baseline signal strength data 333 by determining the signal strength associated with the previously received sensor readings. In various examples, the baseline signal strength can be recalculated after a predefined number of cycles or randomly.

In some examples, the baseline signal strength can be a static number that is calculated upon installation of a new tire 106 on the vehicle 109. In this situation, the sensor unit 103 is presumed to be in the expected location. As such, once the new tire 106 is installed on the vehicle 109, the sensor parameter data 321 can be collected from the sensor unit 103 and the signal strength associated with the collected data can be calculated to determine the baseline signal strength (e.g., baseline signal strength data 333). In various examples, the signal strength is calculated over a predefined number of cycles (e.g., 60 cycles) with the vehicle 109 traveling within a predefined range of speed (e.g., 60-80 miles per hour (mph)).

In some examples, the originally determined baseline signal strength data 333 can be updated over time. For example, while the baseline signal strength data 333 can be calculated upon installation, various factors may cause the baseline signal strength to fluctuate even with the sensor unit 103 remaining in the appropriate position. Some of the factors may include environment factors, such as, for example, temperature, moisture, content of the air, and/or other factors. In some examples, the baseline signal strength data 333 is obtained from one or more vehicle computing devices 112, the corresponding sensor unit 103, and/or other device.

The sensor placement rules 324 include rules, models, and/or configuration data for the various algorithms or approaches employed by sensor placement monitoring system 318, vehicle tire management system 315, sensor monitoring system 336, and/or other application or device. For example, the sensor placement rules 324 can include the various models and/or algorithms for generating the baseline signal strength data 333, generating signal strength data from sensor parameter data 321, and determining whether an issue with a placement of a sensor unit 103 has occurred.

In various examples, the sensor placement rules 324 can include the algorithms for calculating a delta standard deviation, a delta average, and/or other comparison value between a baseline signal strength and a measured signal strength. The sensor placement rules 324 can further include any threshold values that can be used for generating the baseline signal strength data 333 and the measured signal strength data, such as, for example, a number of cycles to measure, a range of speed, and/or other information. In addition, the sensor placement rules 324 can include threshold values to compare with a calculated delta standard deviation, a calculated delta average, and/or other comparison value. In some examples, the threshold values are user defined and are static. In other examples, the threshold values can be dynamic based at least in part on rules or algorithms included in the sensor placement rules 324.

The vehicle 109 includes a plurality of sensor units 103, each sensor unit 103 being positioned on the inside of a respective one of a plurality of tires 106 of the vehicle 109. The sensors units 103 can be employed as part of a tire pressure monitoring system (TPMS) as will be described. Some of the tires 106 are mounted on dual wheel hubs such as in the case where the vehicle 109 comprises an eighteen-wheel tractor-trailer as depicted in FIG. 1.

Each sensor unit 103 comprises a processor and memory to store vehicle tire information for each specific tire 106. For example, the vehicle tire information may include a tire identifier (ID), manufacturing information for the tire 106 (e.g., model number, manufacturer name, etc.), size information (e.g., rim size, width, and outer diameter), manufacturing location, manufacturing date, a treadcap code that includes or correlates to a compound identification, a mold code that includes or correlates to a tread structure identification, and/or other information. The vehicle tire information may also include a service history or other information to identify specific features and parameters of each tire 106. Alternatively or additionally, the vehicle tire information may be included in another sensor unit 103, or in a separate vehicle storage medium, such as a tire ID tag, which preferably is in electronic communication with the sensor unit 103.

The sensor unit 103 further includes an antenna (not shown) for wirelessly transmitting measured parameters and tire information data to a remote processor for analysis, such as a processor integrated into a vehicle computing device 112 and/or a Controller Area Network (CAN) bus 310 associated with the vehicle 109.

It should be noted that although the functionality of the sensor monitoring system is illustrated as being part of the vehicle computing device 112 and the sensor placement monitoring system 318 and the vehicle tire management system 315 are illustrated in FIG. 3 as being part of the computing environment 303, in some embodiments, the functionality of at least a portion of these systems can be implemented within the sensor units 103, as can be appreciated.

The vehicle computing device 112 comprises a processor circuit that executes, for example, a sensor monitoring system 336 and/or other applications. In one embodiment, the vehicle computing device 112 may be integrated with other systems in the vehicle 109. In the case that the vehicle comprises a tractor-trailer, a vehicle computing device 112 may be located on the back of the trailer so as to be within range of wireless communication with the sensor units 103 in the tires 106 of the trailer. The vehicle computing device 112 can also a receiver 319 for obtaining sensor parameter data 321 transmitted from the sensor units 103 on the tires 106 of the vehicle. In various examples, the vehicle computing device 112 can include a communication system to facilitate communication with the computing environment over the network 309. In this respect, the vehicle computing device 112 may include appropriate communications capabilities to link to a cellular network, Wi-Fi network, BLUETOOTH® network, microwave transmission network, radio broadcast networks, or other communication networks.

Also, various data is stored in a data store 326 that is accessible to the vehicle computing device 112. The data store 326 may be representative of a plurality of data stores 326 as can be appreciated. The data stored in the data store 326, for example, is associated with the operation of the various applications and/or functional entities described below In various examples, the sensor monitoring system 336 communicates with the sensor units 103 periodically to obtain information (e.g., sensor parameter data 321) from the sensor units 103, where such information includes a sensor unit identifier 327, pressure values, temperature values, rotation values, acceleration values, and potentially other information from the sensor units 103. Such information is stored, for example, as vehicle tire data 320 in a memory associated with the vehicle computing device 112. In addition, the sensor monitoring system 336 includes a timestamp in each tire sensor data record to indicate when the parameter values were read from a respective sensor unit 103. Alternatively, the sensor units 103 may generate a timestamp at the time it provides the sensor parameter data to the sensor monitoring system 336. In various examples, the sensor monitoring system 336 can comprise a tire pressure monitoring system (TPMS).

In various examples, the sensor monitoring system 336 can be executed to implement the functionalities of the sensor placement monitoring system 318. For example, the sensor monitoring system 336 can be executed to detect a displacement or detachment of a sensor unit 103 from an expected position on a given tire 106 by monitoring the signal strength between the sensor unit 103 and receiver 319 obtaining the sensor parameter data 321 collected by the sensor unit 103 and transmitted to the receiver 319. In various examples, the sensor monitoring system 336 can detect an issue with a placement of the sensor unit 103 by comparing a measured signal strength with a baseline signal strength. In various examples, a delta standard deviation between a measured signal strength and the baseline signal strength is calculated and compared to a predefined threshold value. If the delta standard deviation meets or exceeds the predefined threshold value, the sensor monitoring system 336 can determine that there is an issue with the placement of the sensor unit 103 on the given tire 106.

In one or more examples, upon detecting an issue with the placement of the sensor unit 103, the sensor monitoring system 336 can generate an alert notification indicating the detected issue. The alert notification can be a visual alert (e.g., user interface, indicator light on vehicle, etc.) or an audio alert, as can be appreciated. In some examples, the sensor monitoring system 336 can transmit the alert notification to one or more other vehicle computing devices 112, a client device 306, and/or other device. In some examples, upon detecting the issue, the sensor monitoring system 336 can notify the vehicle tire management system 315 of the issue such that the vehicle tire management system 315 can proceed with sending a notification to the user or associate associated with the vehicle 109.

In various examples, the sensor monitoring system 336 can further be executed to generate a baseline signal strength by determining the signal strength of the sensor unit 103 when the sensor unit 103 is known or presumed to be in the expected (e.g., installed) location on the tire 106. For example, the baseline signal strength can be generated using previously collected sensor parameter data 321 (e.g., temperature, pressure, etc.) and/or previously calculated signal strength data. In this example, the sensor placement monitoring system 318 can obtain a predefined number of previously received sensor readings and generate the baseline signal strength by determining the signal strength associated with the previously received sensor readings. In various examples, the baseline signal strength can be recalculated after a predefined number of cycles or randomly.

In some examples, the baseline signal strength can be a static number that is calculated upon installation of a new tire 106 on the vehicle 109. In this situation, the sensor unit 103 is presumed to be in the expected location. As such, once the new tire 106 is installed on the vehicle 109, the sensor data can be collected from the sensor unit 103 and the signal strength associated with the collected data can be calculated. In various examples, the signal strength is calculated over a predefined number of cycles (e.g., 60 cycles) with the vehicle 109 traveling within a predefined range of speed (e.g., 60-80 miles per hour (mph)).

In some examples, the originally determined baseline signal strength can be recalibrated over time. For example, while the baseline signal strength can be calculated upon installation, various factors may cause the baseline signal strength to fluctuate even with the sensor unit 103 remaining in the appropriate position. Some of the factors may include environment factors, such as, for example, temperature, moisture, content of the air, and/or other factors. In some examples, the baseline signal strength is obtained from a vehicle computing device 112 and/or a sensor unit 103.

In various examples, the sensor monitoring system 336 can further be executed to measure a signal strength based at least in part on an analysis of the sensor parameter data 321 received from one or more other vehicle computing devices 112, a sensor unit 103, and/or other device. For example, the sensor monitoring system 336 can evaluate the RSSI associated with the received sensor parameter data 321 and measure a signal strength over a predefined period of cycles. For example, during operation of the vehicle 109, sensor parameter data 321 can be collected and the collected data can be used to measure the signal strength. Accordingly, the measured signal strength and the baseline signal strength can correspond to data over a same or similar number of cycles that is collected while the vehicle 109 is traveling within a same range of speed.

The client device 306 is representative of a plurality of client devices 306 that may be coupled to the network 309. The client device 306 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 306 may include a display 339. The display 339 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 306 may be configured to execute various applications such as a client application 341 and/or other applications. The client application 341 may be executed in a client device 306, for example, to access network content served up by the computing environment 303, vehicle computing device 112, sensor unit 103, and/or other servers or systems, thereby rendering a user interface 344 on the display 339. To this end, the client application 341 may comprise, for example, a browser, a dedicated application, etc., and the user interface 344 may comprise a network page, an application screen, etc. The client device 306 may be configured to execute applications beyond the client application 341 such as, for example, email applications, social networking applications, word processors, spreadsheets, and/or other applications.

Figure 4:
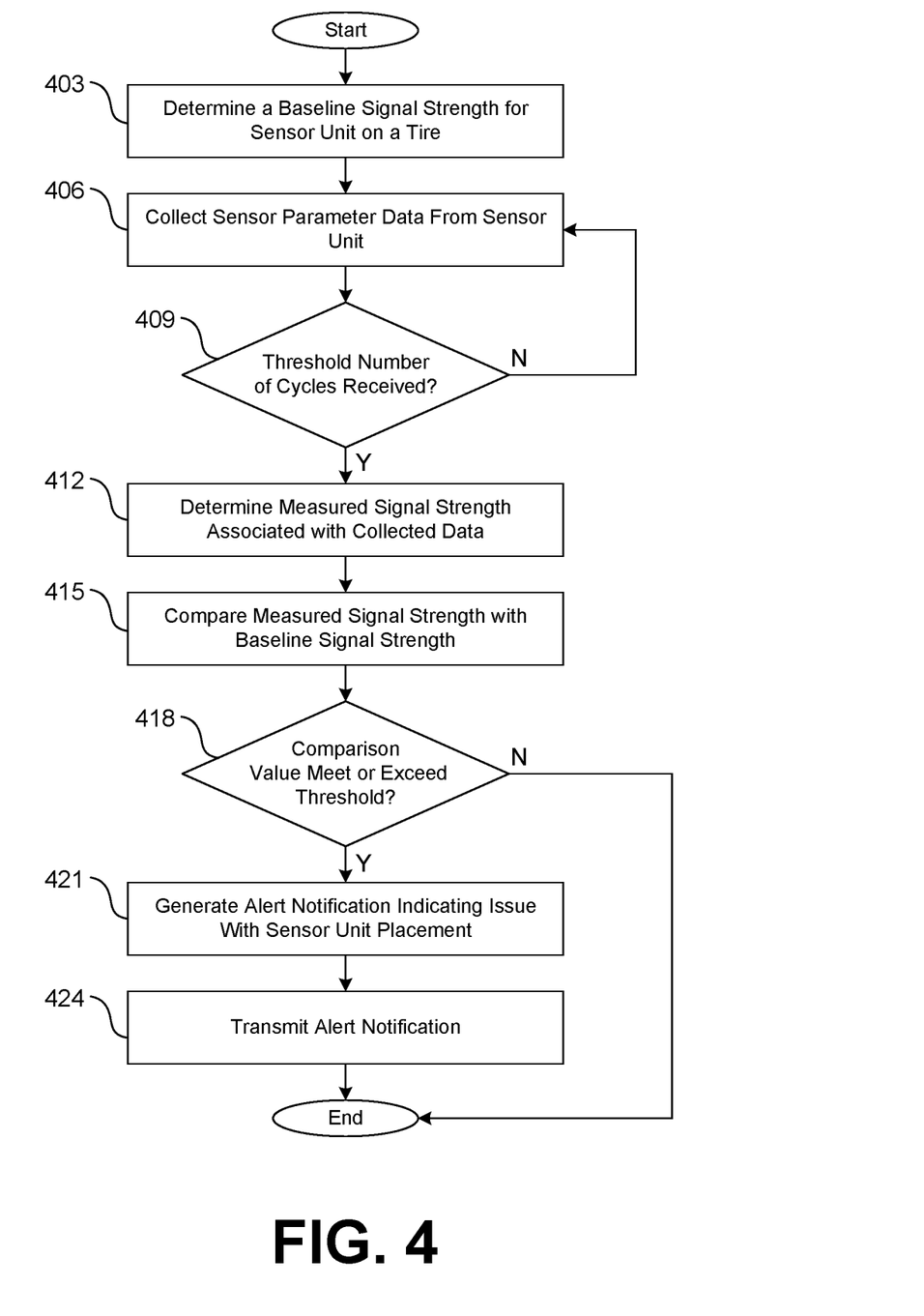
FIG. 4 is a flowchart illustrating one example of functionality implemented as portions of a sensor placement monitoring application executed in a computing environment in the networked environment of FIG. 3 according to various embodiments of the present disclosure.

Next, a general description of the operation of the various components of the networked environment 300 is provided with respect to FIG. 4. To begin, FIG. 4 is an example flowchart 400 that provides one example of the operation of a portion of the sensor placement monitoring system 318 according to various embodiments. It is understood that the flowchart of FIG. 4 provides merely an example of the many different types of functional arrangements that may be employed to implement the operation of the portion of the of the sensor monitoring system 336, sensor placement monitoring system 318, vehicle tire management system 315, and/or other applications as described herein. As an alternative, the flowchart of FIG. 4 may be viewed as depicting an example of elements of a method implemented in the computing environment 303 (FIG. 3) according to one or more embodiments. Although the discussion of FIG. 4 relates to the sensor placement monitoring system 318 it should be noted that the discussed functionality can be implemented in the vehicle computing device 112 (e.g., sensor monitoring system 336), sensor unit 103, and/or another device or system.

Beginning with box 403, the sensor placement monitoring system 318 determines a baseline signal strength for a sensor unit 103 on a given tire 106. The baseline signal strength represents the signal strength of the sensor unit 103 when the sensor unit 103 is known or presumed to be in the expected (e.g., installed) location on the tire 106. In some examples, the sensor placement monitoring system generates a baseline signal strength using previously collected sensor parameter data 321 (e.g., temperature, pressure, etc.) and/or previously calculated signal strength data associated with the given sensor unit 103. In this example, the sensor placement monitoring system 318 can obtain a predefined number of previously received sensor readings from the data store 312, the vehicle computing device 112, and/or sensor unit 103 and generate the baseline signal strength by determining the signal strength associated with the previously received sensor readings.

In some examples, the baseline signal strength can be a static number that is calculated upon installation of a new tire 106 on the vehicle 109. In this situation, the sensor unit 103 is presumed to be in the expected location. As such, once the new tire 106 is installed on the vehicle 109, the sensor data can be collected from the sensor unit 103 and the signal strength associated with the collected data can be calculated. In various examples, the signal strength is calculated over a predefined number of cycles (e.g., 60 cycles) with the vehicle 109 traveling within a predefined range of speed (e.g., 60-80 miles per hour (mph)).

In some examples, the baseline signal strength can be predefined and associated with the vehicle tire data 320. In this example, the sensor placement monitoring system 318 determines the baseline signal strength by obtaining the predefined baseline signal strength data 333 from the vehicle tire data 320 obtained from the data store 312, vehicle computing device 112, sensor unit 103, and/or other system or device.

At box 406, the sensor placement monitoring system 318 collects sensor parameter data 321 from the sensor unit 103. In various examples, the sensor placement monitoring system 318 communicates with the sensor units 103 periodically to obtain information (e.g., sensor parameter data 321) from the sensor units 103, where such information includes a sensor unit identifier 327, pressure values, temperature values, rotation values, acceleration values, and potentially other information from the sensor units 103. In some examples, the sensor parameter data 321 is obtained from a vehicle computing device 112 that is in data communication with both the sensor unit 103 and the sensor placement monitoring system 318.

At box 409, the sensor placement monitoring system 318 determines a threshold number of cycles of sensor parameter data 321 has been collected. For example, a signal strength corresponding to one cycle of data may not be suitable for generating a signal strength that can be compared to the baseline to accurately determine a displacement or detachment of the sensor unit 103 from the tire 106. As such, the sensor placement monitoring system 318 may wait to measure a signal strength until a predefined number of cycles of data is collected. If the threshold number of cycles has been collected, the sensor placement monitoring system 318 proceeds to box 412. Otherwise, the sensor placement monitoring system 318 returns to box 406.

At box 412, the sensor placement monitoring system 318 determines a measured signal strength associated with the collected sensor parameter data 321. In some examples, the sensor placement monitoring system 318 can determine the measured signal strength by evaluating the received signal strength indicator associated with the received sensor parameter data 321 to measure a signal strength over the predefined period of cycles. For example, during operation of the vehicle 109, sensor parameter data 321 can be collected and the collected data can be used to measure the signal strength. In some examples, the measured signal strength corresponds to the signal strength of collected data while the vehicle 109 is traveling within a predetermined range of speed. In other examples, the sensor placement monitoring system 318 can determine the measured signal strength by collecting the measured signal strength from a vehicle computing device 112, the sensor unit 103, and/or another device or system.

At box 415, the sensor placement monitoring system 318 compares the measured signal strength with the baseline signal strength. In some examples, the comparison of the measured signal strength and the baseline signal strength comprises calculating a delta standard deviation between a measured signal strength and the baseline signal strength. In other examples, the comparison of the measured signal strength and the baseline signal strength comprises calculating a delta average between the measured signal strength and the baseline signal strength.

At box 418, the sensor placement monitoring system 318 compares the comparison value with a predefined threshold to determine whether the comparison value meets or exceeds the predefined threshold. If the calculated value meets or exceeds the predefined threshold, the sensor unit 103 can be determined to be loose or otherwise at least partially detached from the expected location of the tire 106. For example, assuming that the predefined threshold is 0.8 and the delta standard deviation is "1.2," the sensor placement monitoring system 318 will determine that the compared value (e.g., 1.8) is greater than or equal to the predefined threshold (e.g., 0.8). If the sensor placement monitoring system 318 determines that the compared value meets or exceeds the predefined threshold, the sensor placement monitoring system 318 proceeds to box 421. Otherwise, the sensor placement monitoring system 318 proceeds to completion.

At box 421, the sensor placement monitoring system 318 generates an alert notification indicating the detected issue.

The alert notification can be a visual alert (e.g., user interface 344, indicator light on vehicle, etc.) or an audio alert, as can be appreciated.

At box 424, the sensor placement monitoring system 318 can transmit the alert notification to a computing device associated with the vehicle and/or user of the vehicle, a client device 306, one or more vehicle computing devices 112, and/or other device. In some examples, upon detecting the issue, the sensor placement monitoring system 318 can notify the vehicle tire management system 315 of the issue such that the vehicle tire management system 315 can proceed with sending a notification to the user or associate associated with the vehicle 109. Thereafter, this portion of the process proceeds to completion.

Figure 5:
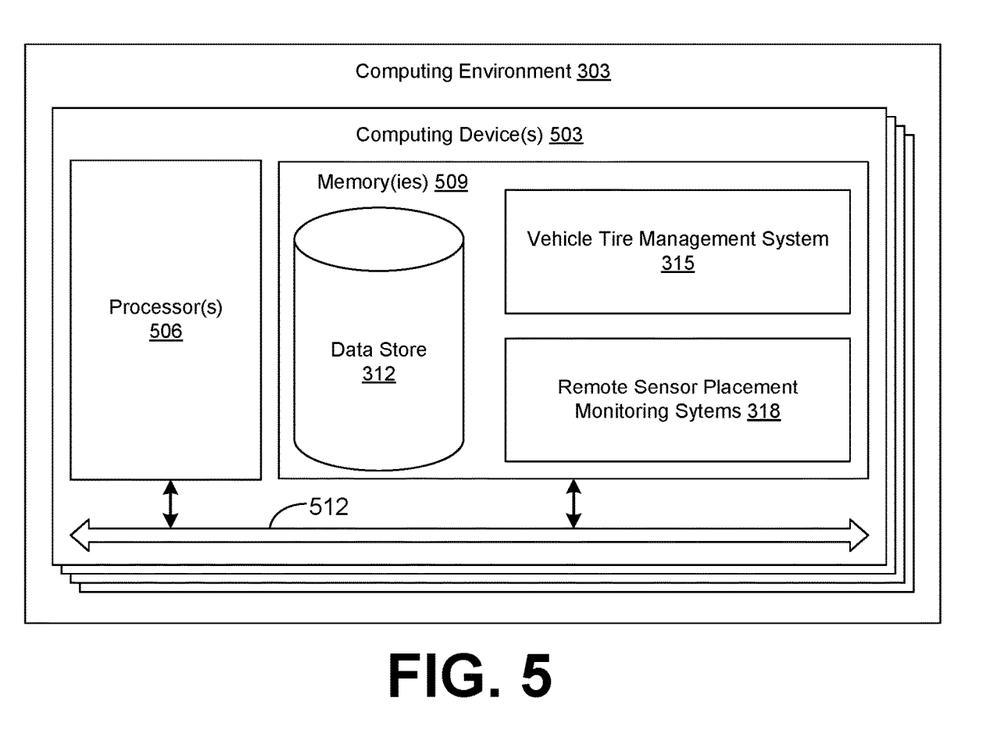
FIG. 5 is a schematic block diagram that provides one example illustration of a computing environment employed in the networked environment of FIG. 3 according to various embodiments of the present disclosure.

With reference to FIG. 5, shown is a schematic block diagram of the computing environment 303 according to an embodiment of the present disclosure. The computing environment 303 includes one or more computing devices 503. Each computing device 503 includes at least one processor circuit, for example, having a processor 506 and a memory 509, both of which are coupled to a local interface 512. To this end, each computing device 503 may comprise, for example, at least one server computer or like device. The local interface 512 may comprise, for example, a data bus with an accompanying address/control bus or other bus structure as can be appreciated.

Stored in the memory 509 are both data and several components that are executable by the processor 506. In particular, stored in the memory 509 and executable by the processor 506 are the vehicle tire management system 315, the sensor placement monitoring system 318, and potentially other applications. Also stored in the memory 509 may be a data store 312 and other data. In addition, an operating system may be stored in the memory 509 and executable by the processor 506.

It is understood that there may be other applications that are stored in the memory 509 and are executable by the processor 506 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 509 and are executable by the processor 506. In this respect, the term "executable" means a program file that is in a form that can ultimately be run by the processor 506. Examples of executable programs may be, for example, a compiled program that can be translated into machine code in a format that can be loaded into a random access portion of the memory 509 and run by the processor 506, source code that may be expressed in proper format such as object code that is capable of being loaded into a random access portion of the memory 509 and executed by the processor 506, or source code that may be interpreted by another executable program to generate instructions in a random access portion of the memory 509 to be executed by the processor 506, etc. An executable program may be stored in any portion or component of the memory 509 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 509 is defined herein as including both volatile and nonvolatile memory and data storage components. Volatile components are those that do not retain data values upon loss of power. Nonvolatile components are those that retain data upon a loss of power. Thus, the memory 509 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 506 may represent multiple processors 506 and/or multiple processor cores and the memory 509 may represent multiple memories 509 that operate in parallel processing circuits, respectively. In such a case, the local interface 512 may be an appropriate network that facilitates communication between any two of the multiple processors 506, between any processor 506 and any of the memories 509, or between any two of the memories 509, etc. The local interface 512 may comprise additional systems designed to coordinate this communication, including, for example, performing load balancing. The processor 506 may be of electrical or of some other available construction.

Although the vehicle tire management system 315, the sensor placement monitoring system 318, the sensor monitoring system 336, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the sensor placement monitoring system 318. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 506 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the vehicle tire management system 315, the sensor placement monitoring system 318, and the sensor monitoring system 336, that comprises software or code can be embodied in any non-transitory computer-readable medium for use by or in connection with an instruction execution system such as, for example, a processor 506 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the vehicle tire management system 315, the sensor placement monitoring system 318, the sensor monitoring system 336, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 503, or in multiple computing devices 503 in the same computing environment 303.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An apparatus, comprising:
at least one computing device comprising a processor and a memory, wherein the at least one computing device is remote from a vehicle; and
at least one application executable on the at least one computing device, wherein when executed, the at least one application causes the at least one computing device to at least:
determine a measured signal strength associated with a sensor unit of a tire on the vehicle;
compare the measured signal strength with a baseline signal strength; and
determine that the sensor unit is detached from an expected location on an innerliner of the tire based at least in part on the comparison of the measured signal strength and the baseline signal strength;
receive sensor unit parameters from a receiver device mounted on the vehicle, the sensor unit parameters collected by the sensor unit; and
determine the measured signal strength based at least in part on an analysis of the sensor unit parameters.

2. The apparatus of claim 1, further determining a delta standard deviation associated with the measured signal strength and the baseline signal strength.

3. The apparatus of claim 2, wherein the sensor unit is determined to be detached when the delta standard deviation meets or exceeds a predefined threshold.

4. The apparatus of claim 1, further determining the baseline signal strength, the baseline signal strength corresponding to a signal strength associated with the sensor unit being positioned in the expected location on the tire.

5. The apparatus of claim 1, further comprising a receiver, and wherein, when executed, the at least one application causes the at least one computing device to at least measure signal strength indicators from sensor unit parameters received by the receiver from the sensor unit over a period of cycles, and the signal strength corresponding to the measured signal strength indicators.

6. The apparatus of claim 1, wherein, when executed, the at least one application causes the at least one computing device to at least generate an alert indicating that the sensor unit is detached from an expected location.

7. A loose sensor detection system for identifying a loose sensor within a tire, the loose sensor detection system comprising:
a sensor unit disposed within an inner surface of the tire;
at least one computing device in data communication with the sensor unit; and
at least one application executable by the at least one computing device, wherein, when executed, the at least one application causes the at least one computing device to at least:
obtain sensor parameter data collected from the sensor unit;
measure a signal strength associated with the sensor unit based at least in part on an analysis of the sensor parameter data;
compare the measured signal strength with a baseline signal strength;

obtain previously collected sensor parameter data from a data storage based at least in part on an identifier associated with the tire;

determine the baseline signal strength based at least in part on the previously collected sensor parameter data;

detect an issue with a placement of the sensor unit within the inner surface of the tire based at least in part on the comparison of the measured signal strength and the baseline signal strength; and generate an alert indicating the issue with the placement of the sensor.

8. The loose sensor detection system of claim 7, wherein the sensor unit comprises at least one of a pressure sensor, a temperature sensor, an accelerometer, a revolution counter, or a storage device for storing identification information for the tire.

9. The loose sensor detection system of claim 7, wherein comparing the measured signal strength with the baseline signal strength comprises at least one of: determining a delta standard deviation or a delta average associated with the measured signal strength and the baseline signal strength.

10. The loose sensor detection system of claim 9, wherein the issue is detected when the delta standard deviation or the delta average meets or exceeds a predefined threshold.

11. The loose sensor detection system of claim 7, wherein the baseline signal strength corresponds to a signal strength when the sensor unit is presumed to be mounted to an innerliner of the inner surface of the tire, and the issue corresponds to the sensor unit being at least partially detached from the innerliner of the inner surface of the tire.

\* \* \* \* \*